(No Model.)
A. BARDELL.
PAN.
No. 369,832. Patented Sept. 13, 1887.
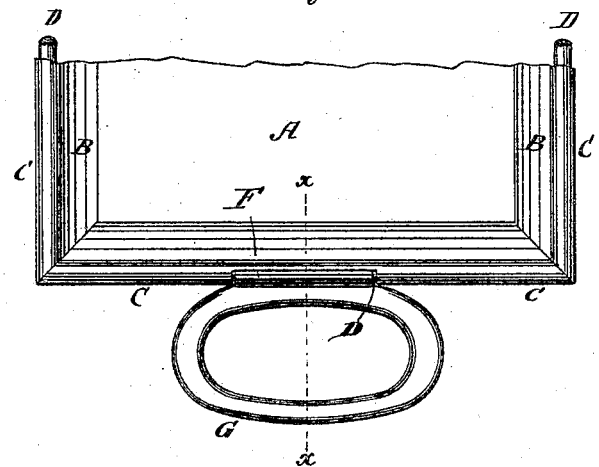
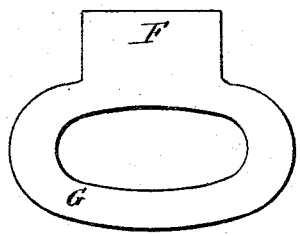
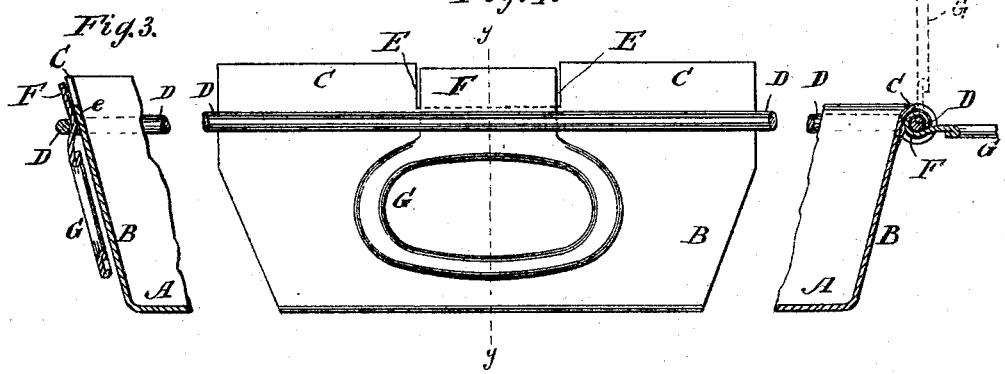
WITNESSES:
Edward Wolff
William Miller
INVENTOR
Alfred Burdell.
BY
Van Santvoord & Hauff
his ATTORNEYS

UNITED STATES PATENT OFFICE.

ALFRED BARDELL, OF BROOKLYN, NEW YORK.

PAN.

SPECIFICATION forming part of Letters Patent No. 369,832, dated September 13, 1887.

Application filed March 10, 1887. Serial No. 230,403. (No model.)

*To all whom it may concern:*

Be it known that I, ALFRED BARDELL, a citizen of the United States, residing at Brooklyn, in the county of Kings and State of New York, have invented a new and useful Improvement in Pans, Dishes, and other Utensils, of which the following is a specification.

This invention relates to an improvement in pans, dishes, and other utensils, as set forth in the following specification and claim, and illustrated in the accompanying drawings, in which—

Figure 1 is a plan view of part of a pan or dish containing my invention. Fig. 2 is a view of a blank for a handle. Fig. 3 is a section in the plane $y\,y$, Fig. 4. Fig. 4 shows in side elevation the manner of securing a handle to a utensil. Fig. 5 is a section in the plane $x\,x$, Fig. 1.

Similar letters indicate corresponding parts.

The pan, dish, or other utensil is formed of sheet metal or any other suitable material, and comprises a base-bottom, A, sides B, and top flanges, C. These flanges are provided by slitting the utensil at its corners, and to strengthen the flanges I provide a re-enforcement, D, made, as shown in Fig. 1, by properly shaping a wire around which the flanges are twined in any suitable manner.

The utensil is shown as provided with a handle, G. Said handle can be readily formed from a suitable sheet-metal blank. (Shown in Fig. 2.) Said handle can be readily attached to the utensil by providing the handle with a lip, F, and placing such lip F between one of the flanges C and the re-enforcement D, as seen in Figs. 3 and 4, and then bending the lip F about this re-enforcement D to the position shown in Fig. 5 at the same time that the flange is turned around the said re-enforcement.

To give room for the attachment of the lip F, a recess, E, Fig. 4, is cut into the flange C at the place of attaching the handle G. The handle G is by this method of attachment left free to swing about the re-enforcement D, as seen in Fig. 5. The flange C at the cut-out portion forms a stop, $e$, to limit the motion of the handle G in one direction, as indicated in Fig. 5, the recess E being of such depth that the material of the flange C at this part is partially curled about the handle-lip, Fig. 5, in the operation of securing the handle to the pan. When the handle is turned to a vertical position, as shown by dotted lines in Fig. 5, its lower portion comes into contact with the stop $e$.

What I claim as new, and desire to secure by Letters Patent, is—

The combination, with the utensil A, formed with the turned-over flanges C, inclosing a re-enforcing wire, D, and cut away to form a recess, of the handle G, having a lip, F, inclosing the re-enforcing wire D at the cut-away flange of the utensil, and limited in its movement in one direction by the cut-away flange, substantially as set forth.

In testimony whereof I have hereunto set my hand and seal in the presence of two subscribing witnesses.

ALFRED BARDELL. [L. S.]

Witnesses:
 E. F. KASTENHUBER,
 A. FABER DU FAUR, Jr.